United States Patent
Kitaguchi et al.

(10) Patent No.: US 6,891,476 B2
(45) Date of Patent: May 10, 2005

(54) ELECTRONIC EXPOSURE DOSE METER AND RADIATION HANDLING OPERATION MANAGEMENT SYSTEM EMPLOYING THE SAME

(75) Inventors: Hiroshi Kitaguchi, Naka-machi (JP); Tetsuya Matsui, Hitachi (JP); Naoya Fukutsuka, Hitachi (JP); Kouichi Ushiroda, Hitachi (JP); Naoyuki Kono, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/097,376

(22) Filed: Mar. 15, 2002

(65) Prior Publication Data

US 2002/0195572 A1 Dec. 26, 2002

(30) Foreign Application Priority Data

Jun. 5, 2001 (JP) ...................................... 2001-168939

(51) Int. Cl.⁷ ............................................. G08B 23/00
(52) U.S. Cl. .................... 340/573.1; 340/600; 340/612; 340/539.1; 340/693.6; 340/632
(58) Field of Search .............................. 340/573.1, 632, 340/600, 612, 539, 539.1, 693.6, 573.4; 250/239, 370, 216, 492.2, 388, 337, 484.5, 336.1, 471.1, 473.1

(56) References Cited

U.S. PATENT DOCUMENTS

| | | | | |
|---|---|---|---|---|
| 4,480,311 A | * | 10/1984 | Mastain et al. | ............. 250/388 |
| 4,642,463 A | * | 2/1987 | Thoms | ..................... 250/336.1 |
| 4,975,584 A | * | 12/1990 | Benjamin et al. | ........... 250/372 |
| 5,235,318 A | * | 8/1993 | Schulcz | ....................... 340/539 |
| 5,572,027 A | * | 11/1996 | Tawil et al. | ............. 250/336.1 |
| 6,031,454 A | * | 2/2000 | Lovejoy et al. | ............. 340/539 |
| 6,492,957 B2 | * | 12/2002 | Carillo, Jr. et al. | ...... 250/336.1 |

FOREIGN PATENT DOCUMENTS

| | | |
|---|---|---|
| JP | 1-261802 | 10/1989 |
| JP | 8-334563 | 12/1996 |

OTHER PUBLICATIONS

Fuji Jiho, vol. 72, No. 6, 1999, pp. 313–317.

* cited by examiner

Primary Examiner—Hung Nguyen
(74) Attorney, Agent, or Firm—Mattingly, Stanger, Malur & Brundidge, P.C.

(57) ABSTRACT

An electronic exposure dose meter and a radiation handling operation management system is capable of realizing real time exposure management. The radiation handling operation management system has monitoring unit receiving an exposure dose amount measured by an electronic exposure dose meter having a radiation detector, its counter circuit and a PHS transmission and reception antenna, from a plurality of transmission and reception base station installed in a radiation handling operation site through bidirectional communication with a central management section via an external management base station, and deriving position of user of the electronic exposure dose meter for collecting and displaying position and exposure dose amount of the user. The electronic exposure dose meter has a radiation detector, a counter circuit, a PHS antenna for bidirectional communication with a central management section. The electronic exposure dose meter generates an alarm in response to an instruction signal from the central management section.

15 Claims, 9 Drawing Sheets

US 6,891,476 B2

ELECTRONIC EXPOSURE DOSE METER AND RADIATION HANDLING OPERATION MANAGEMENT SYSTEM EMPLOYING THE SAME

BACKGROUND OF THE INVENTION

The present invention relates generally to an electronic exposure dose meter and a radiation handling operation management system employing the same. More particularly, the invention relates to an electronic exposure dose meter and a radiation handling operation management system mounting a transmission and reception equipment, such as a personal handy-phone system (PHS) on a personal or individual exposure dose meter, for utilizing personal positioning function of the PHS.

As prior art in radiation exposure management system, there is a management system employing an electronic exposure dose meter, implemented in nuclear power plant or the like. In such system, as reported in Fuji Jiho, Vol. 72, No. 6, pp 313–317 (1999), exposure information corrected through a door way gate to a radiation management zone is transmitted to an exposure management section. In practice, a dose meter is inserted into a gate in contact type, or non-contact communication is performed between the dose meter and the gate, for collection of exposure information. Then, the collected exposure information is transferred to the exposure management section.

On the other hand, as disclosed in Japanese Patent Application Laid-Open No. 1-261802, there is an exposure management system employing a personal or individual exposure dose meter mounting an IC card for careful exposure alarm management during radiation handling operation or collection of detailed exposure trend information.

All of these prior arts set exposure management values in the dose meter per se to generate alarm (buzzer) when there is a likelihood that the exposure amount exceed the exposure management values, to notify the condition to workers, for performing careful exposure management. An aggregating process of the exposure dose amount after radiation handling operation is performed by collecting exposure information through the gate at a time where the workers exit through the door way gate of the management zone.

On the other hand, Japanese Patent Application Laid-Open No. 8-334563 discloses an environmental radiation monitoring system for emergency including a plurality of mobile units performing radiation amount measurement and a parent station performing data processing at a side remote from the mobile units, GPS position detecting devices detecting installation position of respective mobile units and data transmission units for transmitting detected position data and measured radiation amount date to the parent station.

The conventional exposure management systems disclosed in Fuji Jiho, Vo. 72, No. 6, pp. 313–317 (1999) and Japanese Patent Application Laid-Open No. 1-261802 is mainly adapted to exposure management of individual holding the dose meter and is a system for real time management with a management value of individual set in the dose meter per se. Namely, these conventional exposure management systems cannot perform exposure management of particular group of a plurality of workers in real time. Many of radiation handling operations are typical to perform operation by a plurality of workers, such as several tens workers to require exposure management of overall workers. Hereinafter, this will be referred to as planned exposure dose management of operation. Namely, in the conventional management system, a problem is encountered in that total exposure amount management of overall operation can be done after at a time where the group of workers exit the management zone, namely at a time of passing through the door way gate. Also, for each individual worker, since there is no means for transmitting information from the management section, it has not been possible to provide instruction in case of emergency or in erroneous operation in real time. Also, since it has been impossible to collect information about each individual worker concerning to which site the worker enters, how long the worker stayed the side, through which route the worker reached the site. Thus, detailed radiation work analysis was not possible.

On the other hand, the environmental radiation monitoring system for emergency disclosed in Japanese Patent Application Laid-Open No. 8-334563 automatically measures an environmental radiation amount by transmitting detected position data and measured radiation amount data in wireless manner. However, no consideration has been given for collection of information about each individual worker concerning to which site the worker enters, how long the worker stayed the side, through which route the worker reached the site. Thus, detailed radiation work analysis was not possible.

SUMMARY OF THE INVENTION

It is a first object of the present invention to provide a practically useful electronic exposure dose meter and a radiation handling operation management system which can realize real time exposure management.

A second object of the present invention is to provide a radiation handling operation management system which can perform detailed radiation handling operation analysis by collecting information of individual worker.

A third object of the present invention is to provide a radiation handling operation management system which can provide instruction to workers by collecting information of each individual worker.

According to the first aspect of the present invention, a radiation handling operation management system comprises:

monitoring unit receiving an exposure dose amount measured by an electronic exposure dose meter having a radiation detector, its counter circuit and a PHS transmission and reception antenna, from a plurality of transmission and reception base station installed in a radiation handling operation site through bidirectional communication with a central management section via an external management base station, and deriving position of user of the electronic exposure dose meter for collecting and displaying position and exposure dose amount of the user.

According to the second aspect of the present invention an electronic exposure dose meter comprises:

a radiation detector;

a counter circuit counting a radiation detection signal from the radiation detector;

a PHS antenna for bidirectional communication with a central management section; and means for generating an alarm in response to an instruction signal transmitted from the central management section.

According to the third aspect of the present invention, a radiation handling operation management system comprises:

a monitoring unit deriving a position of a user of an electronic exposure dose meter by receiving an exposure dose amount measured by the electronic exposure dose meter and transmitted through a plurality of transmission and reception base station, on the basis of reception signals output from the plurality of transmission and reception base station, and storing the position, the exposure dose amount and date and time with correspondence therebetween.

In the preferred construction, the electronic exposure dose meter may generate an alarm, such as audible alarm, vibration and so on the basis of information transmitted from the central management section via the management base station.

The electronic exposure dose meter may further comprise an external input switch for notifying abnormality to the central management section.

The radiation handling operation management may include a display unit installed in the central management section, which displays a position of user of each electronic exposure dose meter at the radiation handling operation side, a moving route and accumulated exposure dose amount of each individual or particular group on the basis of collected data of the position of the individual user of the electronic exposure dose meter or a plurality of users of the electronic exposure dose meters. The position of user of each electronic exposure dose meter or moving route of the user may be displayed on the basis of a CAD data of the radiation handling facility. The display unit may display a radiation dose rate distribution in the radiation handling operation site on the basis of collected data of the position of the individual user of the electronic exposure dose meter or a plurality of users of the electronic exposure dose meters.

The radiation handling operation management system may further comprise an on-site display unit in the radiation handling operation site to display information equivalent to a display content of a display unit installed in the central management section. Also, the radiation handling operation management system may further comprise a beanie light provided in the radiation handling operation site for generating an alarm upon entry of worker having no permission to enter into the radiation handling operation site to monitor through bidirectional communication.

The radiation handling site and different external organization may be connected through internet or telephone circuit for monitoring condition of radiation handling operation of the radiation handling operation site and providing instruction with a computer and a display unit provided in the external organization. The radiation handling operation management system may directly provide instruction for operation to a management section of particular site or radiation handling operation site through the internet or telephone circuit.

According to the fourth aspect of the present invention, a radiation handling operation management system comprises:

a monitoring unit receiving an exposure dose amount measured by an electronic exposure dose meter having a radiation detector, its counter circuit and a wireless communication unit, from a plurality of transmission and reception base station installed in a radiation handling operation site through bidirectional communication with a central management section via an external management base station, and deriving position of user of the electronic exposure dose meter for collecting and displaying position and exposure dose amount of the user.

According to the fifth aspect of the present invention, an electronic exposure dose meter comprises:

a radiation detector;

a counter circuit counting a radiation detection signal from the radiation detector;

a wireless communication unit for bidirectional communication with a central management section; and means for generating an alarm in response to an instruction signal transmitted from the central management section.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of an electronic exposure dose meter and a radiation handling operation management system according to the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

Figure 1:
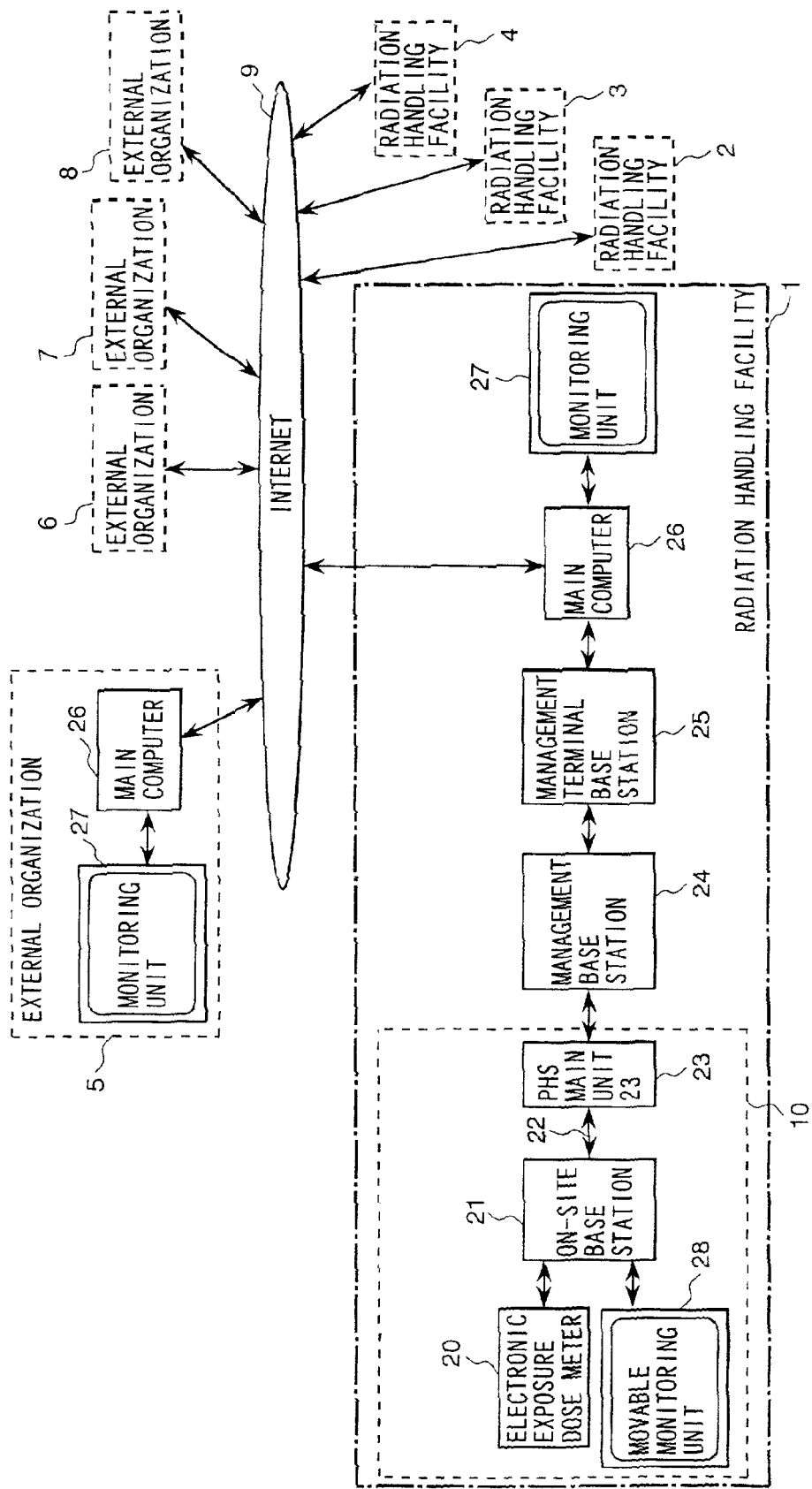
FIG. 1 is an illustration showing a construction of one embodiment of a radiation handling operation management system according to the present invention.

One embodiment of the radiation handling operation management system according to the present invention will be discussed hereinafter with reference to FIGS. 1 to 8. FIG. 1 is an illustration showing a construction of the shown embodiment of the radiation handling operation management system. The radiation handling operation management system is constructed with a plurality of radiation handling facilities 1, 2, 3 and 4 having radiation management zone, such as nuclear power site, hospital and so forth, a plurality of external organization, such as each business organization, each headquarter of company, disaster control center of national government or local government, a central registration center and so forth, and a communication network, such as internet 9, telephone circuit 9a and so forth performing information communication between the radiation handling facilities and external organizations.

In each radiation handling facility 1, 2, 3 and 4, a radiation management zone 10 as a zone to be radiation handling operation site and a general zone other than the radiation management zone are separated. In the radiation management zone 10, an electronic exposure dose meter 20 with a PHS transmission and reception function (hereinafter referred to as PHS dose meter), which is carried by a radiation handling worker, an on-site base station 21 having antenna for communication with the PHS dose meter 20 and provided in the radiation handling operation site, and a PHS main unit 23 connected to an interior wiring network 22 as a PHS circuit network with the on-site base station 21. Also, a movable monitoring unit 28 may be provided in the radiation management zone 10 for monitoring exposure condition on the site or moving route of the worker or the like. In the general zone, a central operation room or the like is provided. In the central operation room, a management base station 24 having an antenna for communication with the PHS main unit 23, a management terminal base station 25 connected to the management base station 24, a main computer 26 connected to the management terminal base station 25, and a monitoring unit 27 connected to the main computer 26 are installed. In each of the external organizations 5, 6, 7 and 8, a main computer 26 and a monitoring unit 27 connected to the main computer 26 are installed.

By the PHS dose meter 20 carried by the radiation handling worker in the radiation management zone 10, an exposure dose amount of exposed radiation handling worker carrying the PHS dose meter 20 and a position information indicative of a site where the radiation handling operation worker as will be discussed later, can be detected. The PHS dose meter 20 has a bidirectional communication ability by means of PHS. Also, the PHS dose meter 20 also has a exposure alarm management function. These information is transmitted to the PHS main unit 23 through the on-side base station 21 in the radiation management zone 10 and the interior wiring network 22 and is transmitted to the management base station 24 provided in the general zone through the PHS main unit 23 and through wire or PHS. The exposure management information and/or work management information transmitted to the management base station 24 is transmitted to the management terminal base station 25, the main computer 26 and the monitoring unit 27 for analysis and display.

By constructing as set forth above, since the exposure management information of the radiation handling worker in the radiation management zone 10 and the work management information can be analyzed and displayed in real time by communication, the exposure condition and work condition on the site can be monitored in the general zone in real time. Also, by receiving information from the movable monitoring unit 28, dynamic recognition of exposure condition per each working group during radiation handling operation on the site and information collection can be performed in real time.

Since the radiation handling facilities 1, 2, 3 and 4 are connected to the external organizations 5, 6, 7 and 8 via the internet 9 or the telephone circuit 9a, monitoring and management information during radiation handling operation and condition of the radiation handling site can be recognized in real time even in the external organizations 5, 6, 7 and 8 by operating the monitoring unit 27 in the external organization.

Figure 2:
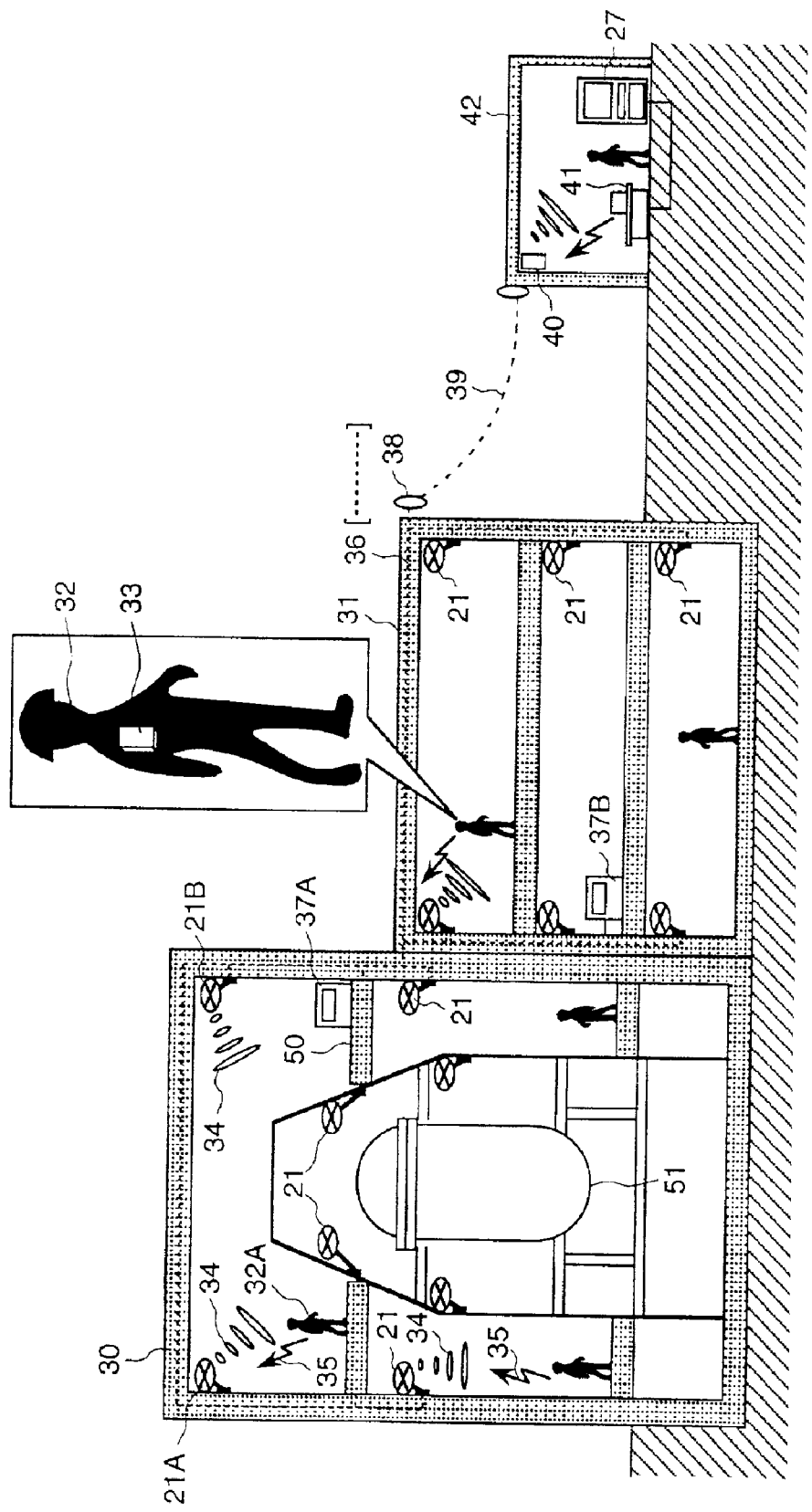
FIG. 2 is a longitudinal section showing a case where a radiation handling facility is a nuclear power generation plant.

FIG. 2 is a longitudinal section showing a case where a radiation handling facility is a nuclear power generation plant. In the nuclear power generation plant, a nuclear reactor building 30 receiving a nuclear reactor 51 and an auxiliary building 31 are radiation management zone 10. In each floor of each building, a plurality of on-site base stations 21 are installed for establishing bidirectional communication with the PHS dose meters 33 carried by the workers 32, namely for transmission 34 from the on-side base stations to the PHS dose meters 33 and for transmission 35 from the PHS dose meters 33 to the on-side base stations 21.

Figure 3:
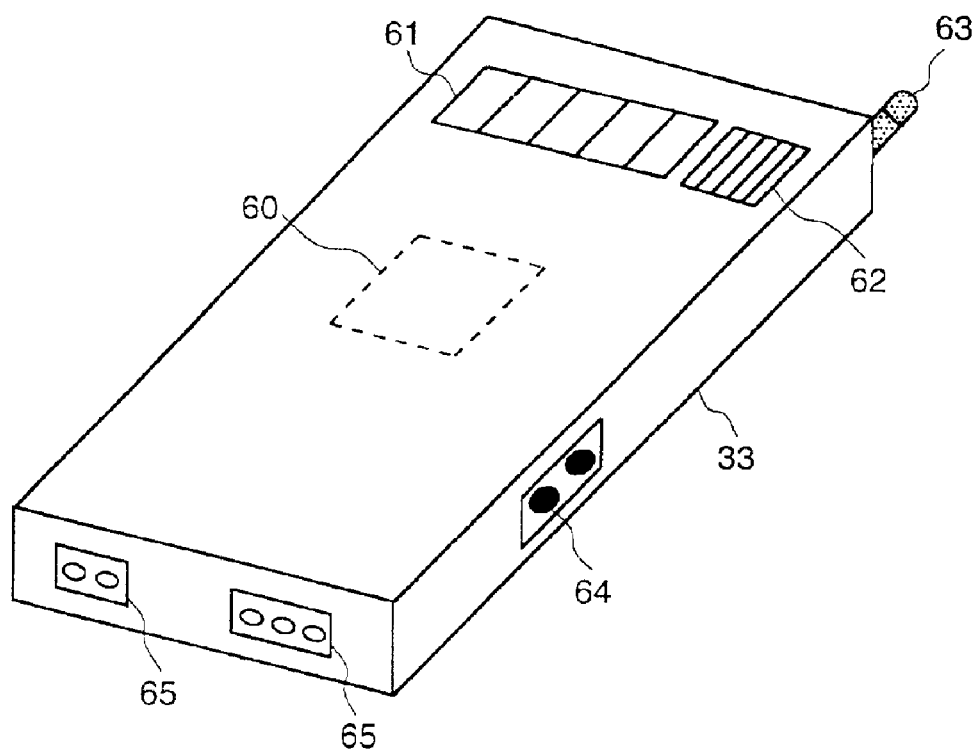
FIG. 3 is a perspective view showing a personal exposure dose meter with a PHS communication function.

FIG. 3 is a perspective view showing a personal exposure dose meter with a PHS communication function. As shown in FIG. 3, the PHS dose meter 33 of the shown embodiment is provided with a radiation detector 60 built therein, a LCD display portion 61 for displaying accumulated exposure amount on out side thereof, a buzzer 62 generating an alarm, a PHS transmission and reception antenna 63, an external input switch 64, a door way gate communication port 65. The buzzer 62 has a vibration function. The external input switch 64 is used for permitting the worker to communicate with the central management section under emergency or special condition. The door way gate communication port 65 is provided both for communication with the PHS dose meter 20 and for door way management.

Figure 4:
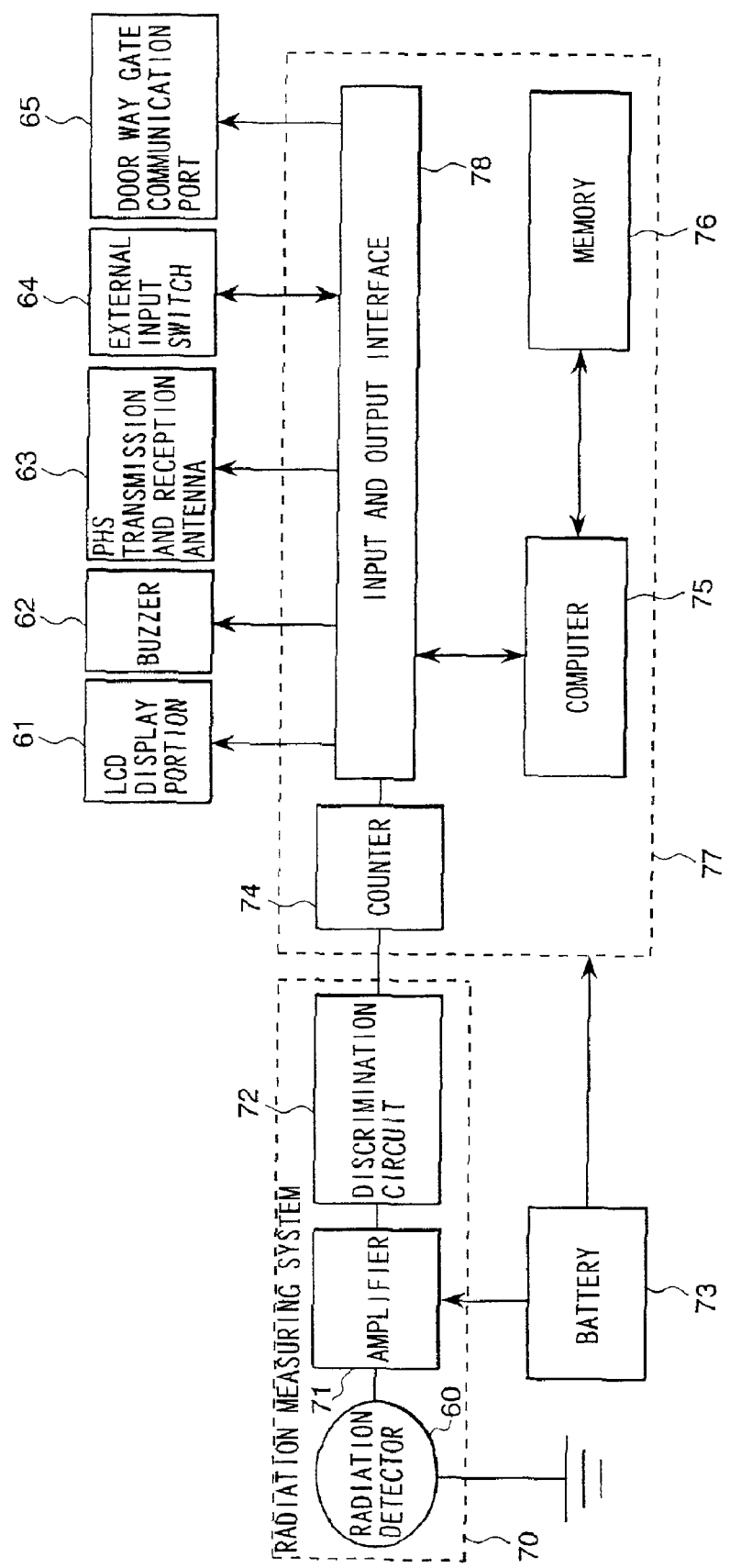
FIG. 4 is an illustration showing a hardware construction of a PHS dose meter.

FIG. 4 shows a hardware construction of the PHS dose meter. A radiation measuring system 70 measuring an exposure amount is constructed with a radiation detector 60, an amplifier 71 and a discrimination circuit 72. A voltage to be applied to the radiation measuring system 70 and an operation power source are supplied from a battery 73. A detection signal of radiation from the discrimination circuit 72 is counted by a counter 74 for managing exposure trend data and accumulated exposure amount from time to time by a data processing portion 77 having a computer 75 and a memory 76. The LCD display portion 61, the buzzer 62 generating the alarm, the PHS transmission and reception antenna 63, the external input switch 64 and the door way gate communication port 65 are connected to the computer 75 via an input and output interface 78. The PHS dose meter of the construction set forth above transmits the exposure trend data and/or the accumulated exposure amount of the radiation handling worker from time to time to the central management section on the basis of an information transmission command signal transmitted from the central management section to the PHS transmission and reception antenna 63.

Position detection of the worker is performed in the following manner. On both end sides of the floor 50 in the nuclear reactor building 30, an on-site base station 21A and an on-site base station 21B are installed. Since a PHS dose meter 33A carried by a worker 32A can communicate with both of the one-side base station 21A and the on-site base station 21B, the position thereof can be estimated from signal intensities received from both stations. Normally, since more than two on-site base stations are provided in each floor, positioning precision can be improved by using reception signals for position recognition. By this method, by recognition process to be performed by the computer in the central operation room 42 or so forth outside of the radiation management zone, the position information of the worker 32A is derived. The exposure amount at that timing is transmitted on the on-site base station 21A. Then, the information is transmitted to a PHS main unit 37A via a PHS circuit network 36 installed in the nuclear reactor building 30 and is then transmitted to the management terminal base station 41 (also referred to as central operation terminal base station 41) via an antenna 38 outside of the building or wire 39, and via the management base station 40 (also referred to as central operation base station 40). The exposure amount is stored in association with the position information of the worker and date and time. By constructing as set forth above, moving route of the worker 32A on the radiation handling operation site and accumulated exposure amount can be monitored in real time. In the monitoring unit 27, site information is displayed based on a CAD data of interior of the building and to perform a dosage rate distribution display or exposure amount display per individual worker or per working group. These collected information are used as database for radiation handling operation analysis per each radiation handling operation.

By monitoring by the monitoring unit 27, when abnormality is detected on individual worker or working group in the radiation handling operation site (strictly a condition possibly cause abnormality), instruction information is transmitted to the individual worker or to the foreman of the radiation handling operation through backward communication route, namely communication route through the management terminal base station 41→the antenna 38 outside of the building→the PHS circuit network 36→the PHS main unit 37A→PHS circuit network 36→on-side base station 21A. Typically, the worker 32A on the wears a multilamellar cloth for antipollution purpose to cause difficulty in notifying the information by display panel (LCD display panel) of the PHS dose meter. Therefore, to the worker 32A, abnormal condition is notified by alarm or vibrator function provided in the PHS dose meter. On the other hand, to the foreman, instruction information may be provided through the on-side monitoring unit 28 provided in the site or by telephone mode of the PHS dose meter.

On the other hand, it is also possible to display a display content equivalent to that displayed on the display unit installed in the central management section, by providing the on-side display unit in the radiation handling operation site. By this arrangement, even in the radiation handling operation site, display content equivalent to that in the central management section can be provided to assist understanding of the content of the instruction.

It is also possible to provide beanie light in the radiation handling operation site to monitor entry of the worker not permitted to enter into the radiation handling operation site for alarming by bidirectional communication. By this, unnecessary entry of the working having no permission into the radiation handling operation site can be successfully prevented.

With the construction set forth above, the radiation handling operation side can be monitored in real time in the management section outside of the radiation management zone.

Figure 5:
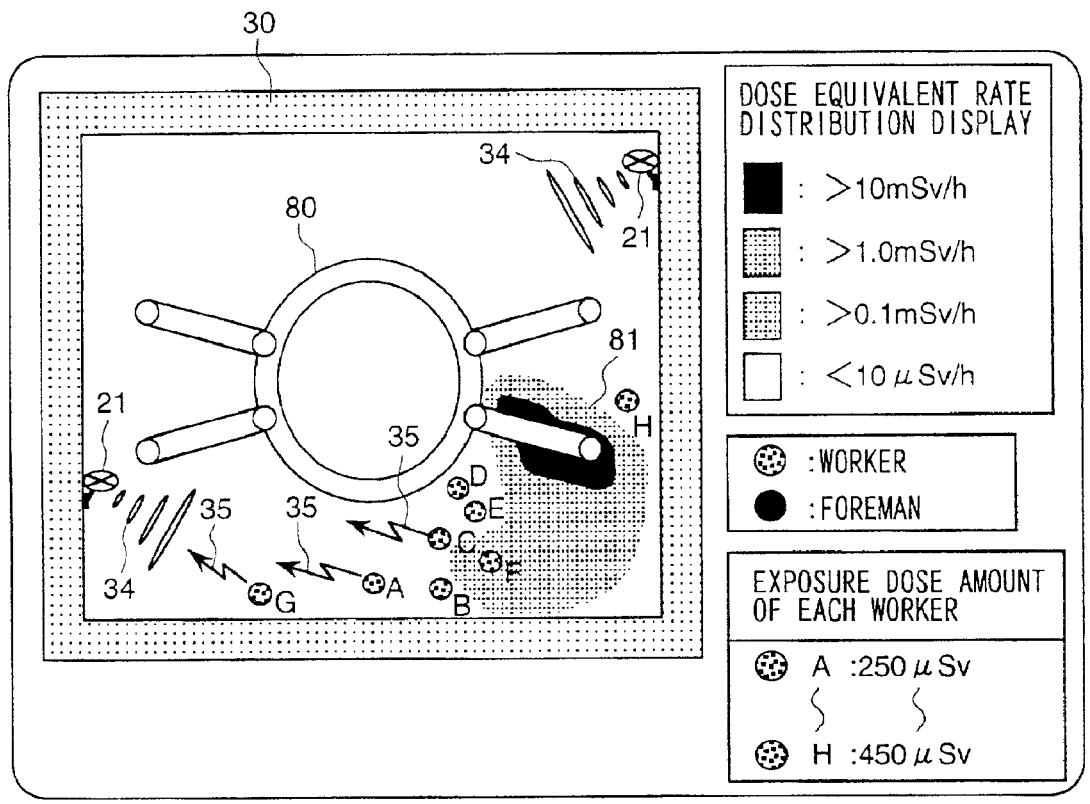
FIG. 5 is a plan view showing an example of a radiation handling operation monitoring display on a monitoring apparatus in a central management station.

FIG. 5 is a plan view showing an example of display of radiation handling operation monitoring on the monitoring unit 27 in the central management section. In FIG. 5, positions of respective radiation handling workers and the foreman A to H are derived from the CAD data 80 of the nuclear reactor construction in the nuclear reactor building 30 for identifying the workers and the foreman A to H at respective positions to display and to display respective accumulated exposure amount on the display screen. On the other hand, a dose equivalent rate distribution 81 (also referred to radiation distribution map 81) is edited on the basis of actual exposure data of the worker to identify exposure level in step levels. Conventionally, collection of the radiation distribution data was managed by measuring the radiation handling management staff member before radiation handling operation. However, in this method, management based on real radiation distribution varying according to progress of radiation handling operation cannot be performed. In the shown embodiment, the condition of radiation handling operation can be monitored in real time in the central management section. When the worker unnecessarily approach high level radiation area, it becomes possible to directly transmit the worker per se or to notify the condition through the foreman.

The management staff member in the central management section is not required to constantly monitor abnormality but can take a method to transmit a voice message and/or display image by an abnormality monitoring software on a computer. When possible approach of the worker to the high level radiation area on the radiation distribution map or entry of the worker into the high level radiation area is detected by the abnormality monitoring software, alarm may be generated. On the other hand, even when the exposure trend data of each individual worker may exceed the exposure management value in view of variation amount, alarm is also generated.

Figure 6:
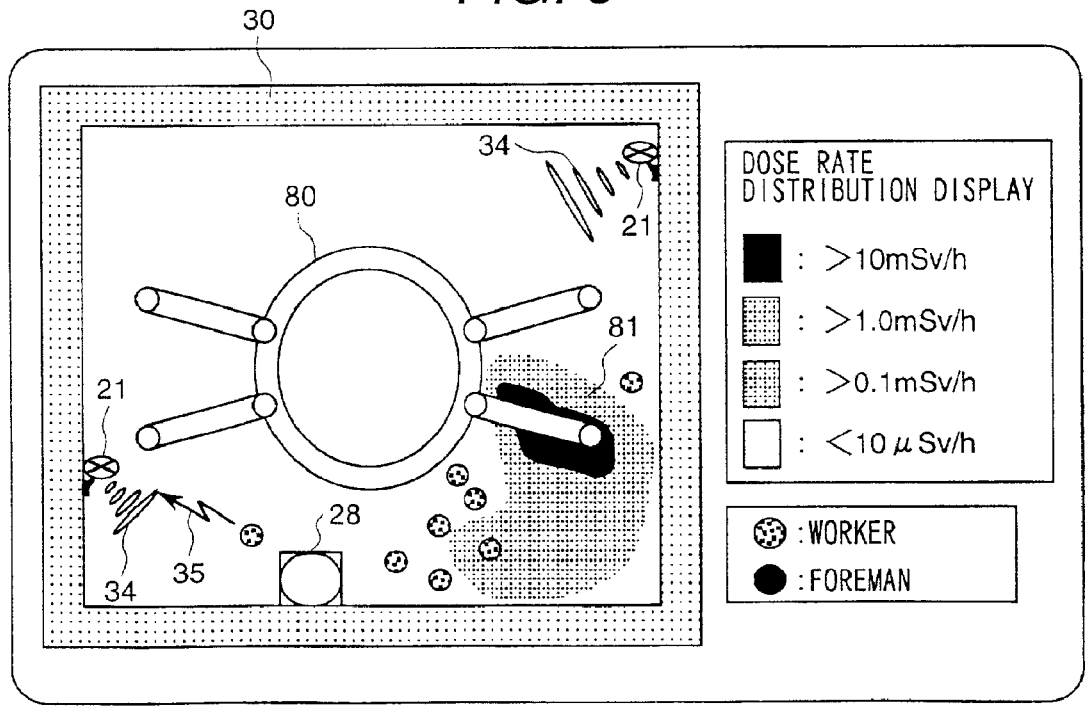
FIG. 6 is an illustration showing an example of display in the case where information is transmitted to a site foreman in a radiation handling site.

FIG. 6 is an illustration showing an example of display in the case where information is transmitted to the foreman in the radiation handling operation site. The movable monitoring unit 28 is provided in the radiation handling operation site. The foreman carries the monitoring unit 28 to the radiation handling operation site. The monitoring information is transmitted to the foreman by transmitting the information from the closest on-site base station 21 to the monitoring unit 28. By utilizing such monitoring unit 28, detailed work administration and monitoring of the radiation handling operation can be effect by the foreman. As such monitoring unit 28, it is desirable to use a portable palm type display unit, such as personal digital assistant (PDA).

Figure 7:
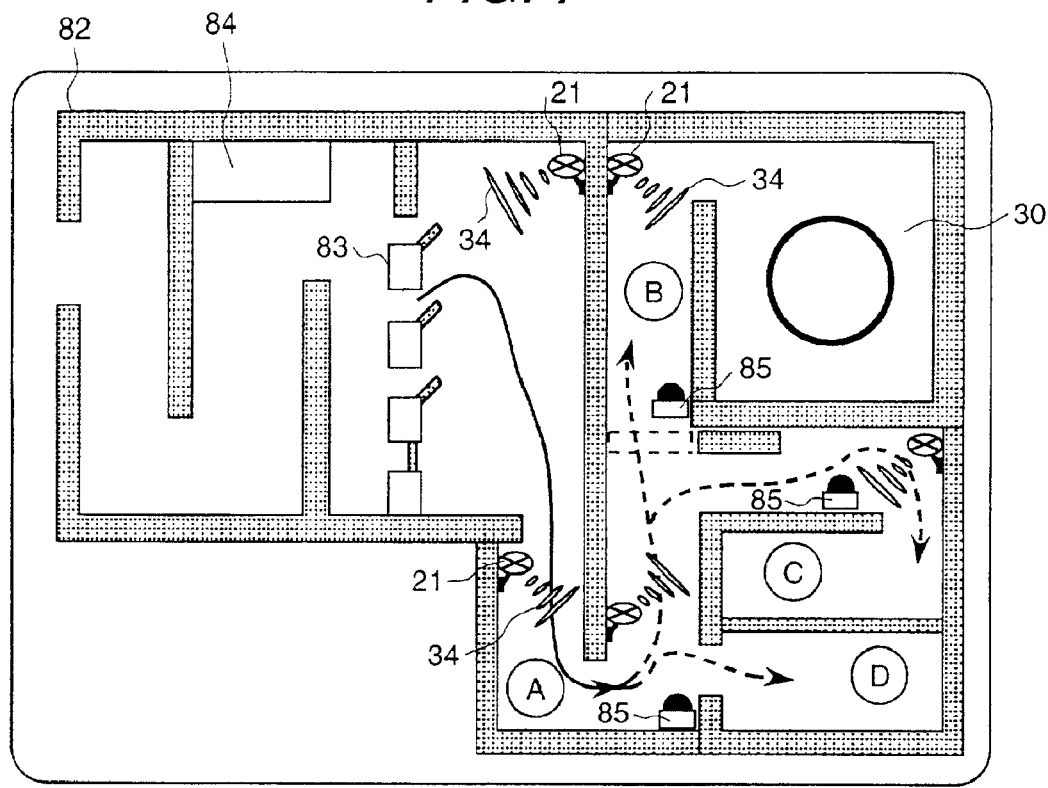
FIG. 7 is a diagrammatic illustration showing an example of display for monitoring overall nuclear power generation plant.

FIG. 7 is a diagrammatic illustration showing an example of display for monitoring overall nuclear power plant. A boundary between the radiation management zone of the nuclear power plant and the general zone is a door way gate 83. On the other hand, in the nuclear power plant 82, as the nuclear reactor buildings 30, there are radiation handling operation sites identified by (A) to (D). In the shown embodiment of the management system, the radiation handling worker receives the PHS dose meter at a PHS dose meter supply site 84 in the general zone. At a timing where the worker passes through a door way gate 83, monitoring of the moving route and exposure dose amount is started. In the radiation handling operation site, the on-site base stations 21 are arranged at appropriate positions so as to permit monitoring of activity of the worker. As set forth above, when the signal from the PHS dose meter is received at a plurality of on-site base stations 21, the position of the worker is derived on the basis of signal intensity ratio of the signals received at respective on-site base stations 21 for displaying trace in time series. In FIG. 7, the moving route of the worker is shown by arrow to know the moving route along which the worker moves. Therefore, while entry into the radiation handling operation site is typically permitted for only workers having permission, entry into the site where entry permission is not required, can also be monitored by the shown system. Accordingly, for entry into an entry inhibited site or a site not given permission, entry inhibiting beanie light or the like is actuated by the central management section using bidirectional communication to notify the condition to the worker per se or other surrounding workers. This condition can also be easily known in the central management section by alarm generated by the monitoring unit. Thus, in the shown system, real time management of the zone passing information or entry information can be easily realized.

Figure 8:
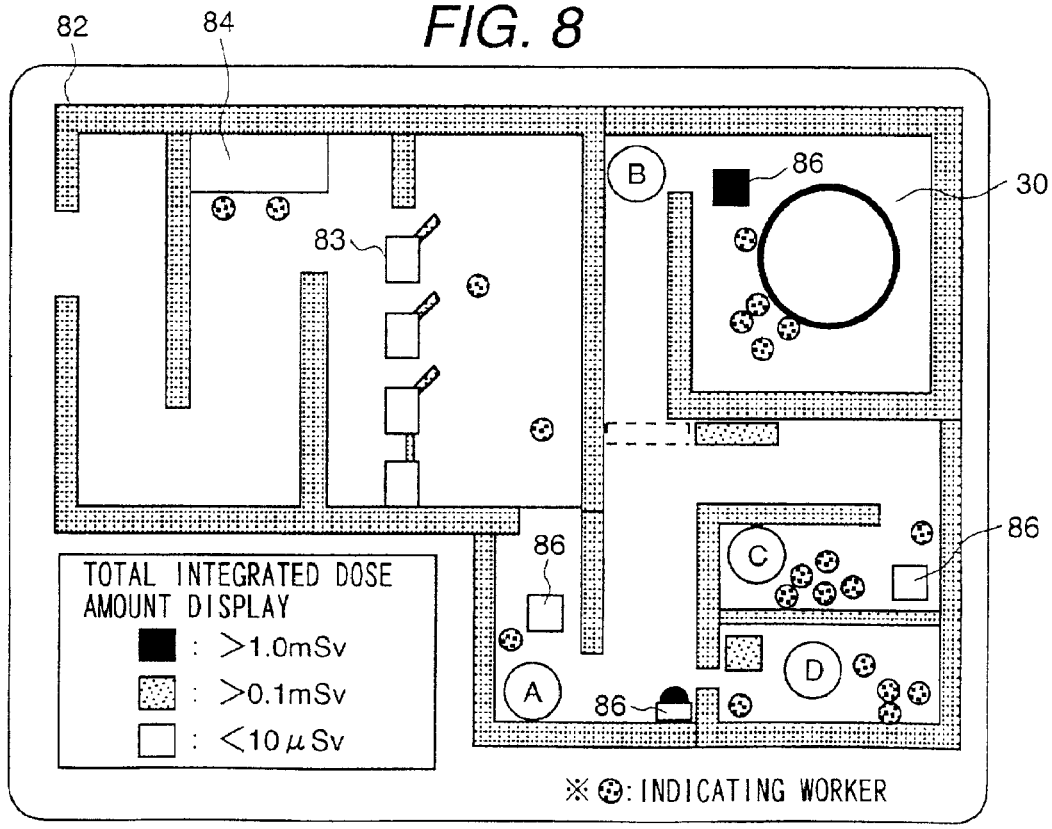
FIG. 8 is a plan view showing an example of display of a monitoring result of accumulated exposure amount per work group.

FIG. 8 is a plan view showing an example of display of a result of monitoring of the accumulated exposure amount per workgroup. In the shown example, without displaying the on-side base stations respectively positioned at appropriate positions, total exposure amounts of respective work groups (A) to (D) are displayed with different colors depending upon exposure levels. The total exposure amount can be easily aggregated, and the total exposure amount is displayed by color coding 86. For each operation, programmed exposure dose amount is set. If the programmed exposure dose amount can be exceeded, the information is automatically notified to the foreman from the central management section. In the conventional management section, total exposure dose amount per work group can be measured only after exiting through the door way gate, namely after end of operation. In contrast to this, with the shown system, the total exposure dose amount can be managed in real time. On the other hand, by preparing detailed database of each operation, operation process management in consideration of reduction of exposure amount of radiation handling operation and effective work plan can be established.

Another embodiment of the present invention will be discussed in terms of nuclear medicine medical cite with reference to FIGS. 9 and 10. It should be noted that the shown system can applicable for various radiation handling facilities.

Figure 9:
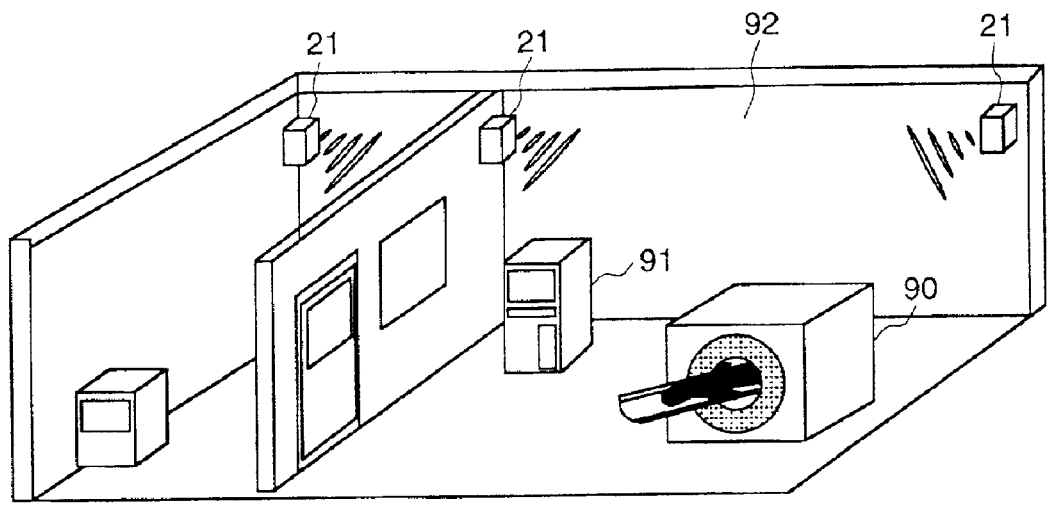
FIG. 9 is a perspective view showing a nuclear medicine medical site.
Figure 10:
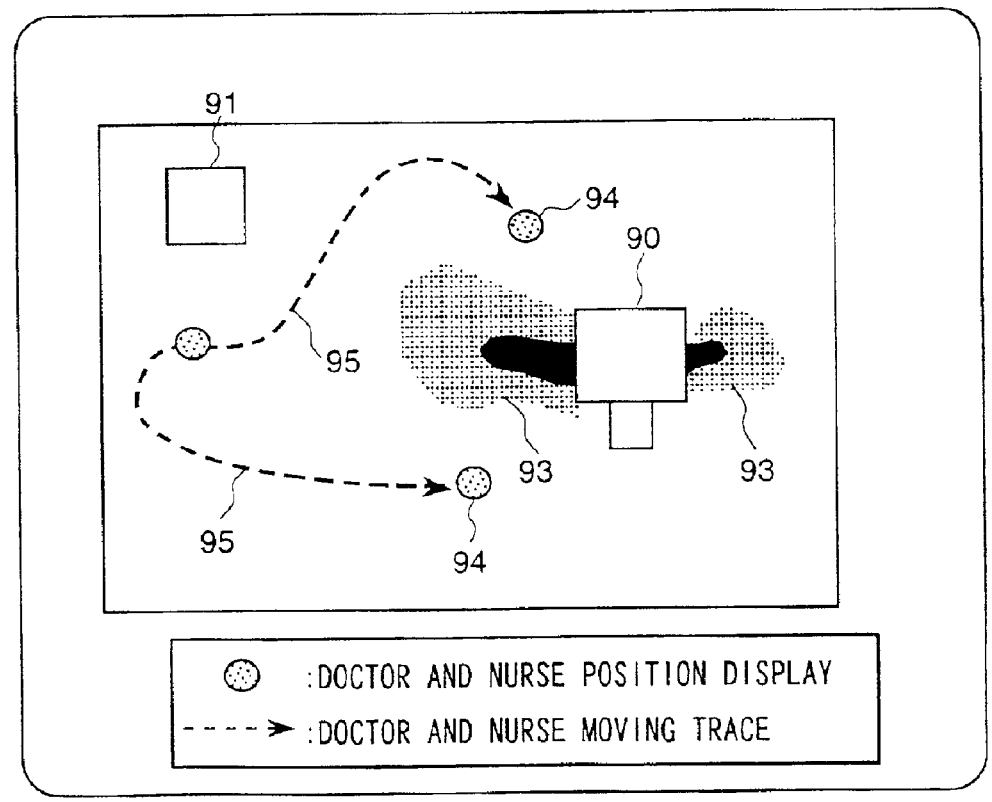
FIG. 10 is a plan view showing an example of display of exposure monitoring.

FIG. 9 is a perspective view showing a nuclear medicine medical site. A round medical device 90 or control unit 91, there is leakage radiation. When distribution of leakage radiation is clear, exposure dosage of the doctors and nurses can be reduced. In the shown embodiment, in various positions in a facility where the medical device 90 is installed, the on-side base stations 21 are arranged, and doctors and nurses carry the PHS dose meters to perform exposure management to realize detailed exposure management. FIG. 10 is a plan view of an example of display of exposure monitoring. Positions 94 of the doctors and nurses and their moving routes 95 can be displayed together with preliminarily measured leakage radiation distribution 93. In some occasion, radioactive material can be dosed to a patient by the nuclear medicine medical apparatus, the environmental radiation distribution can be varied from time to time. By the shown system, the varying radiation distribution can be measured in real time to permit the doctor and the nurses to see the condition in real time. Therefore, it becomes possible to prevent the doctors and nurses to enter into the site where leakage radiation level is high to enable lowering exposure dose amount. In the monitoring unit of the shown system, when the doctor or nurse unwantedly approach the inhibited site, alarm may be generated automatically.

Figure 11:
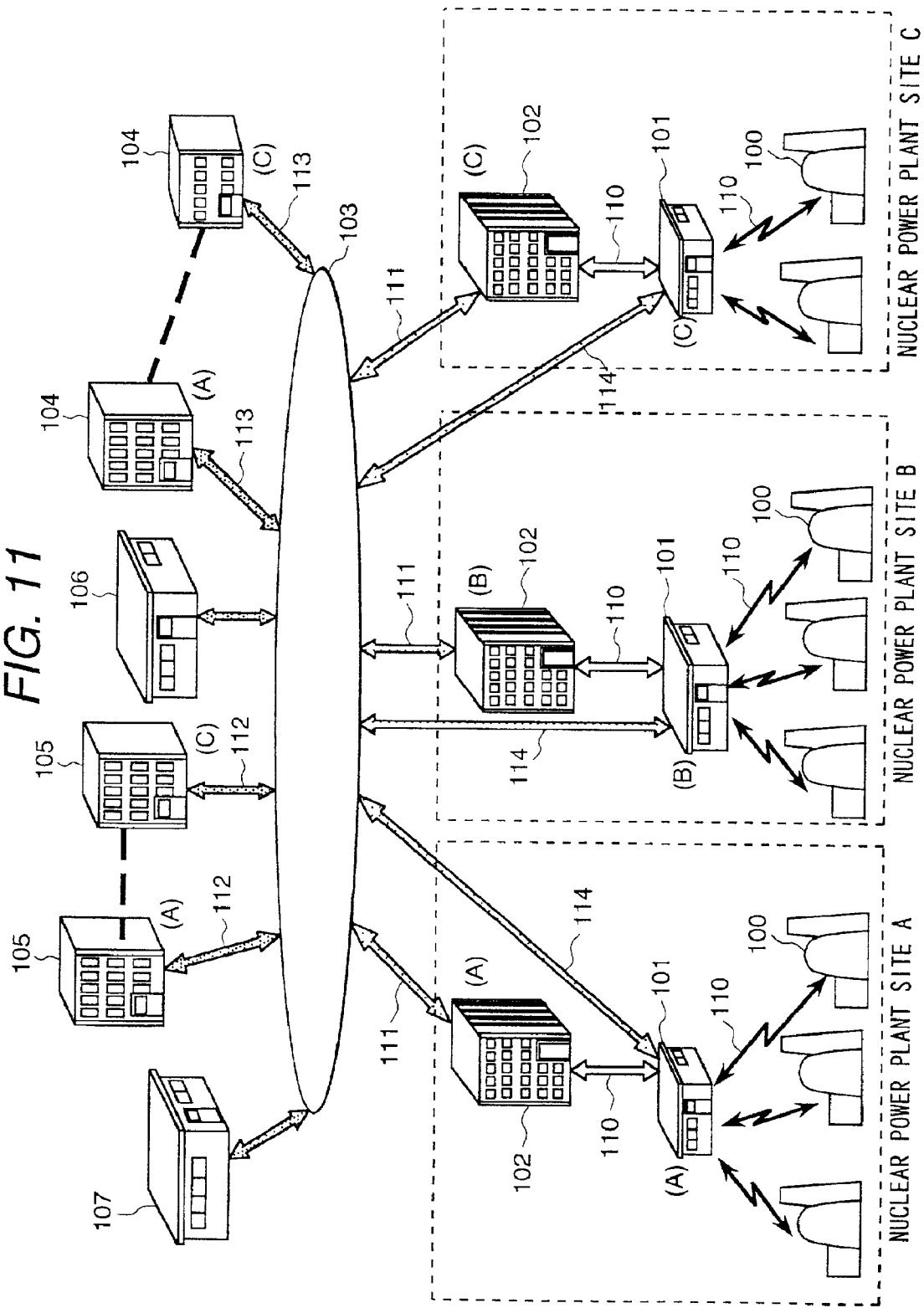
FIG. 11 is an illustration showing a construction of a system, in which a nuclear power generation plant site is linked with an external organization via an internet.

A further embodiment of the present invention will be discussed with reference to FIGS. 11 and 12. FIG. 11 is an illustration showing a construction of a system, in which a nuclear power generation site is linked with an external organization through the internet, telephone circuit or the like. In the nuclear power generation sites A to C, nuclear power plants 100, a contractor 101 of the radiation handling operation, such as plant maker or the like, business organization 102, such as a site electric power company are present. Headquarters 104 of contractors A to C of the radiation handling work, headquarters 105 of business organizations A to C, disaster control center 106 of national government and/or local government, central registration center 107 and so forth, as external organization of the nuclear power generation side are connected through the internet 103, the telephone circuit or the like. In the nuclear power generation site, monitoring information can be seen through the PHS circuit network set forth above. In this system, upon emergency or as required, the condition of operation in the radiation handling operation site can be monitored in real time from respective external organization. For example, from the headquarter 105 of the business organization A, monitoring of the information of the radiation handling operation site and providing of instruction for operation can be performed by bidirectional communication through the telephone circuit 112→network circuit 103→telephone circuit 111. On the other hand, from the headquarter 104 of the contractor A, monitoring of the information of the radiation handling operation site and providing of instruction for operation can be performed by bidirectional communication through the telephone circuit 113→network circuit 103→telephone circuit 114. Upon emergency, link is established with the disaster control center 106 of the national government and/or the local government. While information transmission line to the central registration center 107 is eliminated from illustration, exposure dose history data of each individual worker can be transmitted to the central registration center 107. By the shown embodiment of the system constructed as set forth above, wide area and quick information transmission which cannot be achieved conventionally, can be realized.

Figure 12:
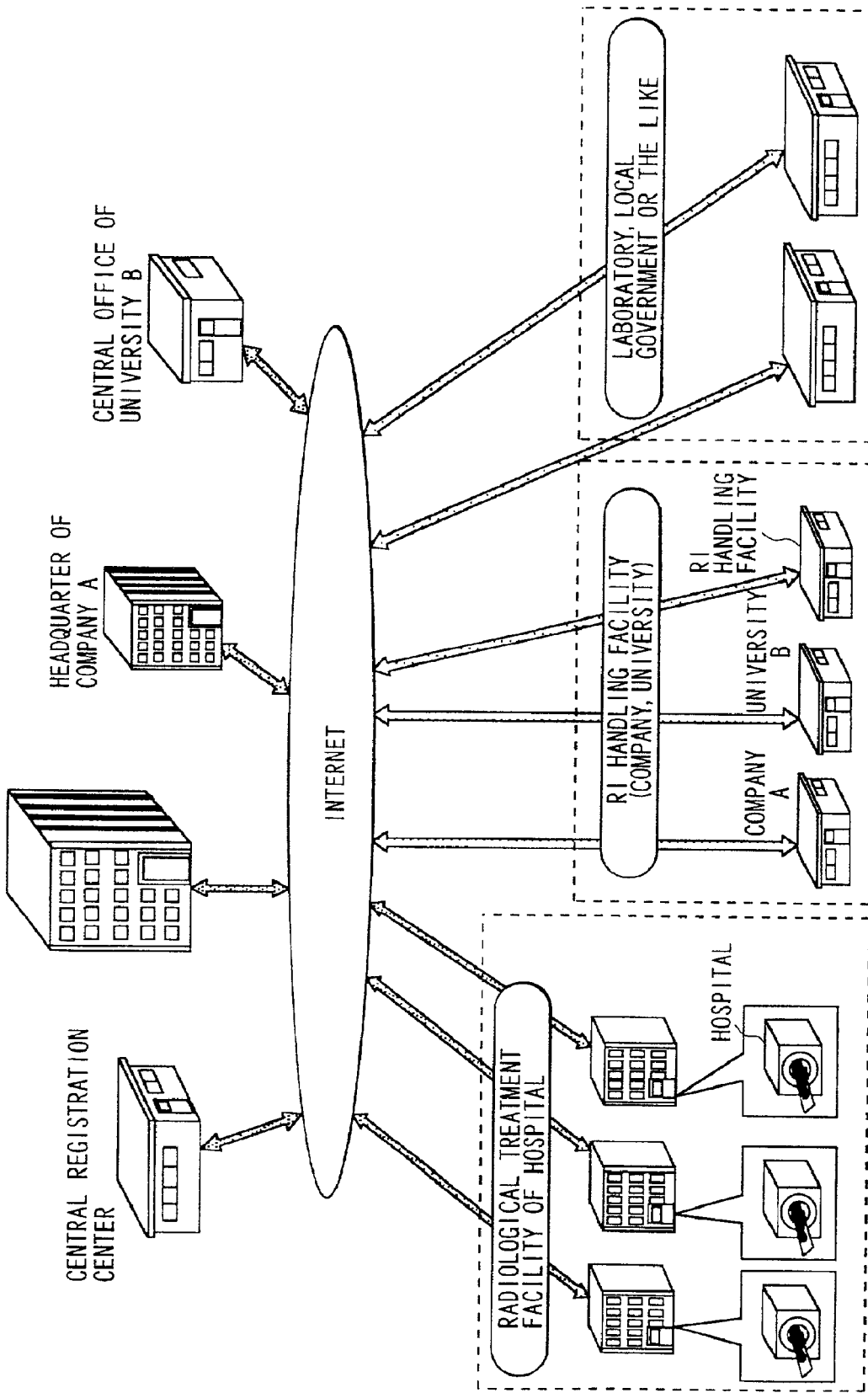
FIG. 12 is a system diagram showing a construction of a system, in which a radiation handling facility other than nuclear power generation plant is linked with an external organization via an internet.

FIG. 12 is an illustration showing a construction where the radiation handling facility other than the nuclear power generation site is linked with the external organization through the internet, the telephone circuit or the like. As general radiation handling facilities other than the nuclear power generation site, there are radiological treatment facility, i.e. inspection facility, in a hospital, radiation handling facility of company or university, laboratories, local government and so forth. While discussion for information transmission lines are eliminated, even in these organization or facility, it becomes possible to establish information transmission system with the external organization, such as the central registration center, disaster control center of the national government and/or the local government, the headquarter of the company, a central office of university and so forth.

In the shown embodiment, by real time communication between the PHS dose meter and the central management section, in the central management section outside of the management zone, the exposure dose condition of each work group can be detected to permit aggregation management of the exposure dose amount per work group in real time. Monitoring of emergency or erroneous operation and providing instruction can be performed in real time. On the other hand, since the moving route or condition of the worker can be seen in time series to permit detailed radiation handling operation analysis and to facilitate planning of the radiation handling operation plan for the next time with reduction of exposure and improving work efficiency.

With the present invention, monitoring of the radiation handing site can be done from outside of the radiation management zone in real time and can directly provide instruction to the worker on the radiation handling site as required. Thus, reliable and highly useful radiation handling management system can be provided.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

For instance, the system construction of the present invention is not limited to particular radiation handling facility, such as nuclear power plant or the like and can establish information transmission in wide area with the external organization through the telephone circuit and internet. In the shown system construction, condition of the radiation handling operation site can be recognized in real time by access to the external organization. On the other hand, as required, radiation handling operation management providing instruction to the site can be performed in real time.

Also, while the present invention has been discussed in terms of the preferred embodiment employing PHS as communication equipment, any appropriate communication systems, such as Bluetooth system, Cellular phone system, wireless LAN system and so forth may also be employed.

What is claimed is:

1. A radiation handling operation management system, comprising:
    a portable electronic exposure dose meter adapted to be carried by a user having a radiation detector for detecting the exposure dose of a user at the radiation handling site, a counter circuit, a display unit for displaying position and exposure dose amount of the user, and a transmission and reception antenna, and
    a station at which data is processed;
    wherein exposure dose amount data is directly transmitted from the dose meter carried by the user to the station through real-time bi-directional communication therebetween, and
    wherein the processed data is directly transmitted from the station to the user to display the data, and to give an alarm to the user when necessary.

2. A radiation handling operation management system as set forth in claim 1, further comprising:
    a monitoring unit arranged to derive a position of the user by receiving exposure dose data measured by said electronic exposure dose meter and transmitted to the monitoring unit, and storing said position, said exposure dose amount, and date and time with correspondence among the position, exposure dose amount, and date and time.

3. A radiation handling operation management system as set forth in claim 1, wherein a display unit installed in said station displays a position of the user at the radiation handling operation site, a moving route and accumulated exposure dose amount of said user on the basis of collected data of the position of said user.

4. A radiation handling operation management system as set forth in claim 1, wherein the position of the user or moving route of the user is displayed on the basis of Computer Aided Design (CAD) data of the radiation handling facility.

5. A radiation handling operation management system as set forth in claim 1, wherein a display unit installed in said station displays a radiation dose rate distribution in the radiation handling operation site on the basis of collected data of the position of the user of the electronic exposure dose meter.

6. A radiation handling operation management system as set forth in claim 1, which further comprises an on-site display unit in said radiation handling operation site to display information equivalent to a display content of a display unit installed in said station.

7. A radiation handling operation management system as set forth in claim 1, which further comprises a beanie light provided in said radiation handling operation site for generating an alarm upon entry of one having no permission to enter into the radiation handling operation site, said alarm being generated in response to a signal provided from said station through said bidirectional communication.

8. A radiation handling operation management system as set forth in claim 1, wherein the radiation handling site and an external organization are connected through the Internet or a telephone circuit for monitoring a condition of radiation handling operation of the radiation handling operation site, and providing instruction with a computer and a display unit provided in said external organization.

9. A radiation handling operation management system as set forth in claim 8, wherein the external organization directly provides instruction for operation to a management section of said radiation handling operation site through said Internet or telephone circuit.

10. A radiation handling operation management system as set forth in claim 1, further comprising:
    a monitoring unit arranged to receive exposure dose data measured by said electronic exposure dose meter, and to derive a position of the user of said electronic exposure dose meter for collecting and displaying a position and exposure dose amount of the user.

11. A radiation handling operation management system, further comprising:
    a plurality of said portable electronic exposure dose meter;
    wherein exposure amount data is directly transmitted from each of said dose meters carried by respective users to the station through real-time bi-directional communication between the station and the users; and
    wherein the processed data is directly transmitted from the station to each of the users to display the data, and to give an alarm to each user if necessary.

12. A radiation handling operation management system as set forth in claim 11, further comprising:
    a monitoring unit arranged to derive a position of each of the users by receiving exposure dose data measured by said electronic dose meters and transmitted to the monitoring unit, and storing for each user said position, said exposure dose amount, and date and time with correspondence among the position, exposure dose amount, and date and time.

13. A radiation handling operation management system as set forth in claim 11, wherein a display unit installed in said station displays a position of each of the users at the radiation handling operation site, a moving route and accumulated exposure dose amount of each of the users on the basis of collected data of the position of each of the users.

14. A radiation handling operation management system as set forth in claim 11, wherein a unit display unit installed in said station displays a radiation dose rate distribution in the radiation handling operation site on the basis of collected data of the position of each of the users of the electronic exposure dose meters.

15. A radiation handling operation management system as set forth in claim 11 further comprising:

a monitoring unit arranged to receive exposure dose data measured by said electronic exposure dose meters, and to derive a position of each of the users of said electronic exposure dose meters for collecting and displaying a position and exposure dose amount of each user.

* * * * *